(12) United States Patent
Lance

(10) Patent No.: US 9,810,575 B2
(45) Date of Patent: Nov. 7, 2017

(54) TOOL TO ASSIST IN PAINT MATCHING

(71) Applicant: Rande Lance, Ojai, CA (US)

(72) Inventor: Rande Lance, Ojai, CA (US)

( * ) Notice: Subject to any disclaimer, the term of this patent is extended or adjusted under 35 U.S.C. 154(b) by 375 days.

(21) Appl. No.: 14/596,256

(22) Filed: Jan. 14, 2015

(65) Prior Publication Data

US 2016/0202125 A1    Jul. 14, 2016

(51) Int. Cl.
G01J 3/46     (2006.01)
G01J 3/02     (2006.01)
G01J 3/52     (2006.01)

(52) U.S. Cl.
CPC ........... G01J 3/0272 (2013.01); G01J 3/0267 (2013.01); G01J 3/463 (2013.01); G01J 3/52 (2013.01)

(58) Field of Classification Search
CPC ......... A47J 43/28; A47J 43/288; B05C 17/10; B25B 11/00; B44D 3/003; G01J 3/0267; G01J 3/0272; G01J 3/463; G01J 3/52
USPC .......... 118/500, 503; 211/DIG. 1; 248/206.5; 269/8; 294/65.5; 335/285; 40/600, 40/661.01; 427/140, 142, 8; 7/167; 81/487
See application file for complete search history.

(56) References Cited

U.S. PATENT DOCUMENTS

| | | | | |
|---|---|---|---|---|
| 2,723,875 A | * | 11/1955 | Russell | H01F 7/0257 294/65.5 |
| 2,873,136 A | * | 2/1959 | Bennet | B01L 3/18 294/65.5 |
| 3,411,723 A | | 1/1966 | Kohn | |
| 4,105,239 A | * | 8/1978 | Akczinski, Sr. | A47L 13/41 294/210 |
| 4,155,140 A | * | 5/1979 | Janssen | B05C 17/00 15/145 |
| 4,172,597 A | * | 10/1979 | Smith | A63F 3/062 273/148 R |
| 4,633,563 A | * | 1/1987 | Rykaczewski | B25B 9/02 29/270 |
| 4,643,426 A | * | 2/1987 | Adams | A63F 3/0625 273/148 R |
| 4,658,461 A | * | 4/1987 | Roe | B05C 17/00 15/144.1 |

(Continued)

OTHER PUBLICATIONS

Creative Mechanisms Blog. "Everything You Need to Know about Polypropylene (PP) Plastic".*

(Continued)

Primary Examiner — Larry E Waggle, Jr.
Assistant Examiner — Tyrone V Hall, Jr.
(74) Attorney, Agent, or Firm — Diana D. Brehob

(57) ABSTRACT

There are procedures typically used in auto body shops to assist in matching a proposed paint mix with that on undamaged portions of the vehicle. A test panel is taped to a stick and arranged next to the panel to be matched at a couple of angles. The present procedures are unrepeatable and often utilize two individuals. According to embodiments of the present disclosure, a wand has a test panel portion with embedded magnets. The test panel is attracted to the test panel portion via the magnets and the wand holds onto the vehicle panel also via the magnets. The lower side of the test panel portion that sits against the vehicle has at least two flat surfaces at different angles so that the wand can be placed on the surface of the vehicle, or other surface, to assess the paint match from the different angles.

17 Claims, 3 Drawing Sheets

(56) References Cited

U.S. PATENT DOCUMENTS

| | | | | |
|---|---|---|---|---|
| 4,802,702 | A * | 2/1989 | Bownds | A47L 13/41 294/210 |
| 5,217,744 | A | 6/1993 | Little | |
| 5,249,832 | A * | 10/1993 | Leonardz | A47G 25/902 223/111 |
| 5,429,402 | A * | 7/1995 | Kennedy | B03C 1/28 15/160 |
| 5,709,838 | A | 1/1998 | Porter | |
| 5,991,961 | A * | 11/1999 | Zurik | A45D 34/04 15/104.94 |
| 6,217,934 | B1 | 4/2001 | Eilenberger | |
| 6,247,736 | B1 * | 6/2001 | Esterson | A47J 43/288 294/7 |
| 6,319,442 | B1 * | 11/2001 | Downs | B65H 37/002 264/132 |
| 6,415,470 | B1 * | 7/2002 | Ramrattan | A45D 34/04 15/144.4 |
| 7,185,385 | B2 * | 3/2007 | Kohler | A45D 34/04 132/320 |
| 7,953,274 | B2 | 5/2011 | Sara | |
| 8,176,609 | B2 * | 5/2012 | Branon | B25B 11/002 29/221.6 |
| 8,746,765 | B1 * | 6/2014 | Mafi | A47J 43/288 294/7 |
| 2004/0070224 | A1 * | 4/2004 | Nurmi | B25B 11/002 294/65.5 |
| 2010/0034573 | A1 * | 2/2010 | Moyers | A46B 5/0033 401/6 |

OTHER PUBLICATIONS http://tricountymetals.com/choose-your-color/fade-resistant-metal-roofing/, last accessed on Nov. 6, 2014.
http://www.ebay.com/itm/Tupperware-Tupperchef-Mini-Silicone-Spatula-Blue-Fridge-Refrigerator-Magnet-NEW-/271475668342, last accessed on Nov. 6, 2014.
http://www.teslamotorsclub.com/showthread.php/9552-Front-License-Plate-Solutions/page19?highlight=Position+hte+magnets++parts, last accessed on Nov. 6, 2014.

* cited by examiner

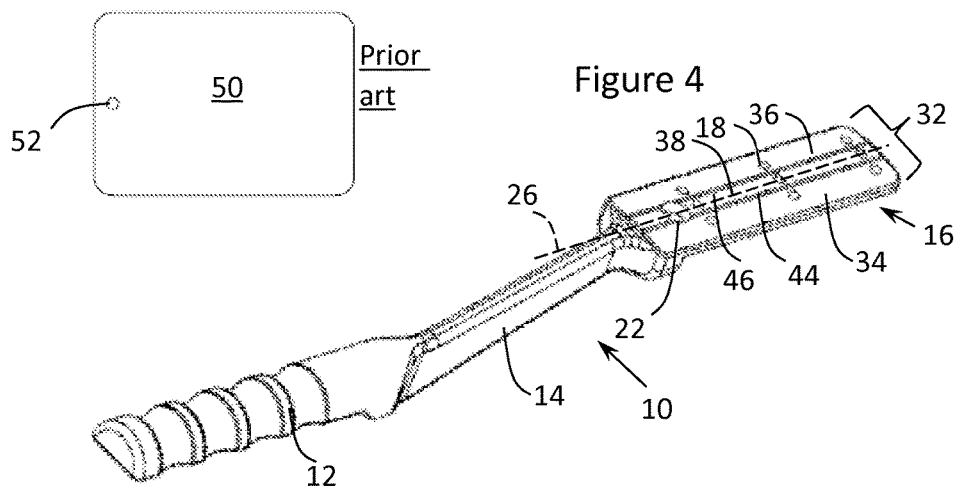
Figure 1
Figure 4
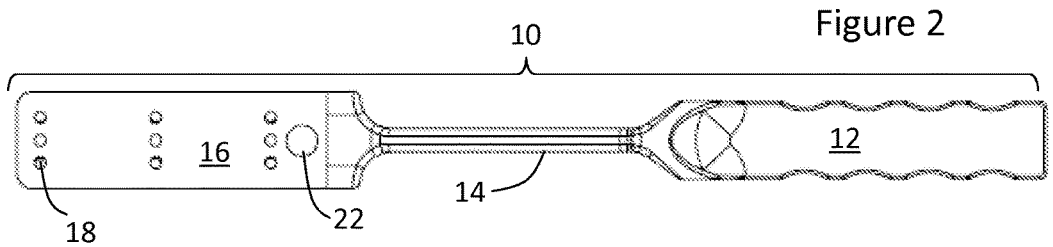
Figure 2
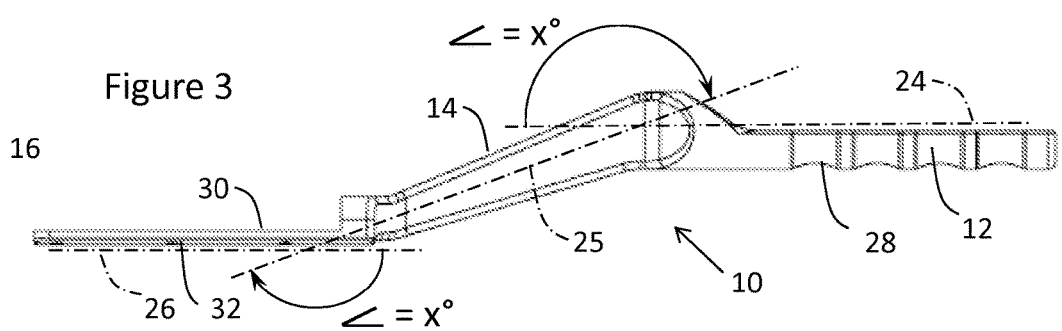
Figure 3

TOOL TO ASSIST IN PAINT MATCHING

FIELD

The present disclosure relates to an accessory to aid in matching paint color to that of painted surfaces, in particular metal surfaces.

BACKGROUND

In the paint department of body shops, there are techniques that have been developed to find a paint mix for a panel to be painted that matches the color of non-damaged panels of the vehicle. There are standard metal test panels (4" by 6" used in North America) that are painted with the proposed paint mix. Such a test panel 50 with a hole 52 is shown in FIG. 1. The paint mix is painted on test panel 50 and then compared to the vehicle panels that are not to be painted to determine whether the match is suitable.

Typically, the test panels are attached with tape to a wooden stick like a paint stirring stick. The painter holds the wooden stick and sprays the paint on the test panel. Often, the painter also gets some paint on their hand in the process due to overspray. To determine whether the proposed paint mix is appropriate, one person holds the test panel next to the car and another person stands back to evaluate. The person holding the panel can rotate the test panel, as needed, to get the view of the paint at various angles. Depending on the type of paint, e.g., metallic, mica, or fully-pigmented colors, the paint changes color depending on the viewing angle. For paints that exhibit this phenomenon, particularly metallic paints, it is important to view the match of the paint face on, at a slight angle, and a steeper angle. A single person can assess the match on their own, i.e., without someone holding the test panel, by taping the test panel to the car and standing back to view it. That person readjusts the test panel onto the car using tape multiple times to obtain the desired viewing angle, possibly leaving adhesive on the vehicle's panel. In yet another alternative, the painter attempts to assess the match holding the wooden stick at arm's length and adjusting the angle. Arms length is marginal, at best. Usually such a technique is insufficient to obtain a proper assessment. After a suitable match is determined, the test panel with the proper paint mix is removed from the stick. The stick is disposed of and the test panel is retained in a catalog, often secured through hole 52 of test panel 50.

The process can be cumbersome requiring multiple people or requiring a number of trips back and forth between the car and a viewing position to obtain the desired angle of the test panel on the vehicle. Furthermore, the process can be unrepeatable because it is difficult to obtain the same, suitable angle using tape and also unrepeatable with a human hand holding the test panel next to the vehicle.

SUMMARY OF DISCLOSURE

To overcome at least one problem in the prior art, a wand is disclosed that includes: a handle section and a test panel section coupled to the handle section. The test panel section has an upper flat side that and a lower side that has at least a first flat surface and a second flat surface. The first and second flat surfaces form a predetermined angle. At least one of the first and second of the flat surfaces is not parallel to the upper flat side.

The handle section can be coupled to the test panel section via a transition section.

The test panel has a first plurality of holes defined in the first flat surface of the test panel section and a second plurality of holes defined in the second flat surface of the test panel section. The wand further includes: a first plurality of magnets inserted into the first plurality of holes and a second plurality of magnets inserted into the second plurality of holes.

An outer surface of the first plurality of magnets is flush with or below the first flat surface; and an outer surface of the second plurality of magnets is flush with or below the second flat surface.

The first and second pluralities of magnets extend into the test panel section to the flat surface associated with the upper side to thereby attract metallic surfaces proximate the upper side and the lower side.

At least a surface of the wand is comprised of a paint-resistant material in some embodiments. The wand may be made of polypropylene.

The predetermined angle formed between the first and second flat surfaces is in a range of 183-200 degrees and a line of intersection between the first and second flat surfaces is substantially parallel to an axis taken along the long direction of the handle section.

In some embodiments, the lower side further includes a third flat surface which forms an angle with the second flat surface. The third flat surface is not parallel to the upper flat side.

The handle section has multiple depressions along its length to thereby form a hand grip.

The handle section is coupled to the test panel section via a transition section and a hole is defined in the test panel section at a location proximate the transition section.

A first plurality of glue dots are applied to the first flat surface of the test panel section and a second plurality of glue dots are applied to the second flat surface of the test panel section. In some embodiments, glue dots are applied to the upper flat side of the test panel section to thereby adhere a non-ferromagnetic test panel.

A tool for aiding in paint matching, also called a wand, is disclosed that includes: a handle section, a transition section coupled to the handle section, a test panel section coupled to the transition section, and a plurality of magnets embedded in the test panel section.

The transition section and the test panel section intersect to form a predetermined angle. The handle section and the transition section intersect to form the predetermined angle. An axis taken along the length of the handle section and a line taken along the length of the test panel section are substantially parallel.

The test panel section has an upper flat side and a lower side that has at least a first flat surface, a second flat surface, and a third flat surface. The first flat surface forms a first line of intersection with the second flat section that is substantially parallel to a line running along the length of the test panel section and the second flat surface forms a second line of intersection with the third flat section that is substantially parallel to the line running along the length of the test panel section.

A first portion of the plurality of magnets is embedded in the first flat surface. A second portion of the plurality of magnets is embedded in the second flat surface. A third portion of the plurality of magnets is embedded in the third flat surface.

In some embodiments, the outer surface of the wand is paint resistant and/or gray in color.

The handle section, the transition section and the test panel section are integrally formed.

Also disclosed is a wand having a handle section, a transition section coupled to the handle section, a test panel section coupled to the transition section, and a test panel section coupled to the handle section. The test panel section has an upper side that has a flat surface and a lower side that has first and second flat surfaces. A first plurality of magnets is embedded in the first flat surface and a second plurality of magnets embedded in the second flat surface.

The lower side further includes a third flat surface with a third plurality of magnets embedded therein. The first and second flat surfaces intersect in a first predetermined angle. The second and third surfaces intersect in a second predetermined angle. A line of intersection between the first and second flat surfaces is substantially parallel to a line of intersection between the second and third flat surfaces.

The handle section, transition section, and test panel section are integrally formed of polypropylene with the magnets inserted into openings provided in the test panel section.

An advantage of the present disclosure is that the assessment of the paint mix can be performed by a single individual with good repeatability. There is no need to re-tape the test panel to the car multiple times. The repeatability of the angle of the test panel with respect to the vehicle panel is minimized by using a wand as disclosed. Because the handle portion is displaced from the surface of the panel to which the paint is being matched, fingerprints or paint prints from overspray onto hands are largely prevented from being transferred to the vehicle during the matching process. Also, the waste of tape and paint sticks is avoided because the wand can be reused indefinitely. In embodiments in which the wand is made of a paint resistant material, there is no paint buildup.

BRIEF DESCRIPTION OF THE DRAWINGS

FIG. 1 is an illustration of a standard test panel used in body shops;

FIGS. 2-4 are views of a wand according to an embodiment of the disclosure;

DETAILED DESCRIPTION

Figure 5:
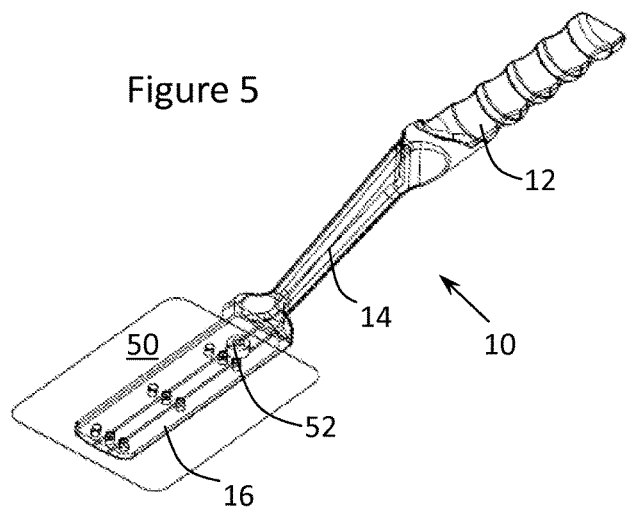
FIG. 5 is an illustration of the wand of FIGS. 2-4 with a test panel affixed.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

A top view of a wand 10 is shown in FIG. 2 that has a handle section 12 coupled to a transition section 14 coupled to a test panel section 16. Test panel section 16 has holes 18 into which magnets can be inserted. A hole 22 is defined in test panel section 16. Hole 22 is provided to line up with a hole in a test panel (FIG. 1) to aid in alignment. It is desirable to have the transition section to allow the handle section to be offset from the test panel section. However, in a lighter-weight, less-expensive alternative, the handle couples directly to the test panel section with no substantive transition section between the two.

A side view of wand 10 is shown in FIG. 3. Handle section 12 has indentations 28 to form a comfortable hand grip for the user of wand 10. An axis 24 along the length of handle section 12 intersects an axis 25 that goes through the center of transition section 14 with an angle equal to x. Axis 25 intersects a line 26 parallel to test panel section 16 also with the angle alpha. Axis 24 and line 26 are parallel. Test panel section 16 has an upper side 30 and a lower side 32. In use, a test panel (element 50 of FIG. 1) is placed on upper side 30 and the test panel is coated with a test paint. Lower side 32 is placed on a car body panel, or any panel to be painted, to aid in determining whether the test paint is sufficiently close in color to that existing on the panel to be painted. Transition section 14 is provided so that the handle section is displaced from the surface of the panel to be evaluated.

An isometric view of wand 10 in FIG. 4 shows that lower side 32 has three flat surfaces 34, 36, and 38. Flat surface 34 intersects flat surface 38 at line 46; flat surface 36 intersects flat 38 at line 44. The lines 44 and 46 of intersection are substantially parallel to line 26 that runs along the length of the test panel section 16.

In FIG. 5, an isometric view of a wand 10 is shown with a test panel 50. Test panel 50 and wand 10 are shown in a transparent view in FIG. 5. In FIG. 5, the magnet are not shown in holes 20, but would be used to attract test panel 50 which is ferromagnetic. In the event that test panel 50 is not ferromagnetic, an adhesive can be employed to secure test panel 50 to test panel section 16 of wand 10. Test panel 50 has a hole 52 that is aligned with hole 22 (separately shown in FIG. 2) of wand 10.

Figure 6:
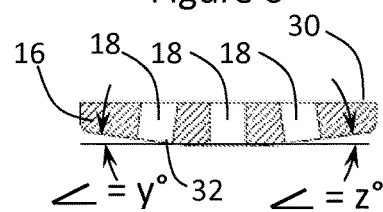
FIG. 6 is a cross-sectional representation of a portion of the test panel section of the wand of FIGS. 2-5 in which the lower side has three flat surfaces.

In FIG. 6, a cross section of test panel section 16 illustrates upper side 30 is flat and lower side 32 has three flat surfaces. The center section of lower surface 32 is parallel to top surface 30. The left hand section of lower surface 32 is offset from a straight line parallel with upper surface 30 with an angle of y°. The right hand section of lower surface 32 is offset from a straight line parallel with upper surface 30 with an angle of z°. In FIG. 6, y equals z. However, in an alternative embodiment, y is different from z. Also, in FIG. 6, the center section of lower surface is parallel to top surface 30. However, in an alternative embodiment, the center section is offset to allow even another angle of viewing.

In the non-limiting embodiment in FIG. 6, angles x and y are 7°. The angle may be any angle, preferably in the range of 3 to 15°. The optimal angle for paint matching may depend on paint type, paint sheen, paint color, and lighting.

Figure 7:
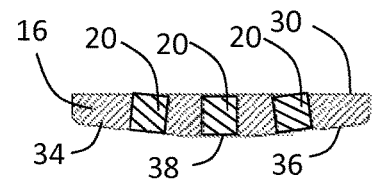
FIG. 7 is the cross-sectional representation of the view in FIG. 6 with magnets inserted into holes provided in the test panel section of the wand.

In FIG. 7, which is a cross section of test panel section 16, magnets 20 are inserted into openings 18. Magnets 20 are right circular cylinders and are identical to minimize the number of different parts. Magnets 20 are not flush with upper surface 30. In some embodiments, this is suitable because there is sufficient magnetic force attracting the paint panel. In other embodiments, the magnets are longer than those shown in FIG. 7. So that the magnets can be flush with top surface 30, the magnets in the left and right sections are cut off on the top surface and are no longer right circular cylinders.

Magnets 20 are press fit into the provided holes in test panel section 16. Alternatively, they are inserted with an adhesive to keep them in place. In an alternative embodiment, the magnets are retained via threads or any suitable retainer. In another alternative embodiment, test panel section 16 is injection molded and the openings for the magnet have flaps through which magnets 20 are inserted and then retained. In yet another embodiment, wand 10 is injection molded around magnets 20. In FIGS. 2-5, 9 holes 18 of equivalent diameter are shown for holding magnets. Alternatively, more or fewer holes are provided. In other embodiments, magnets of different size are used to provide the desired magnet force to retain the wand onto a vehicle panel and/or the test panel onto the test panel section of the wand.

Figure 8:
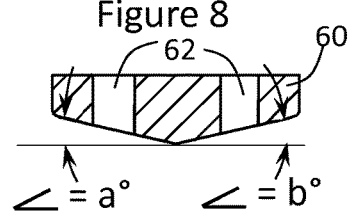
FIG. 8 is a cross-sectional view of a test panel section according to an embodiment of the disclosure in which the lower side has two flat surfaces.

In FIG. 8, a cross-section of an alternative test panel section 60 is shown that has two portions to the lower surface. The left section of the lower side is offset from being parallel to the upper side by an angle a. The right section is offset by an angle b. Holes 62 are provided to accommodate magnets. Angles a and b are congruous in FIG. 8. However, angle a is different than angle b in an alternative embodiment.

Figure 9:
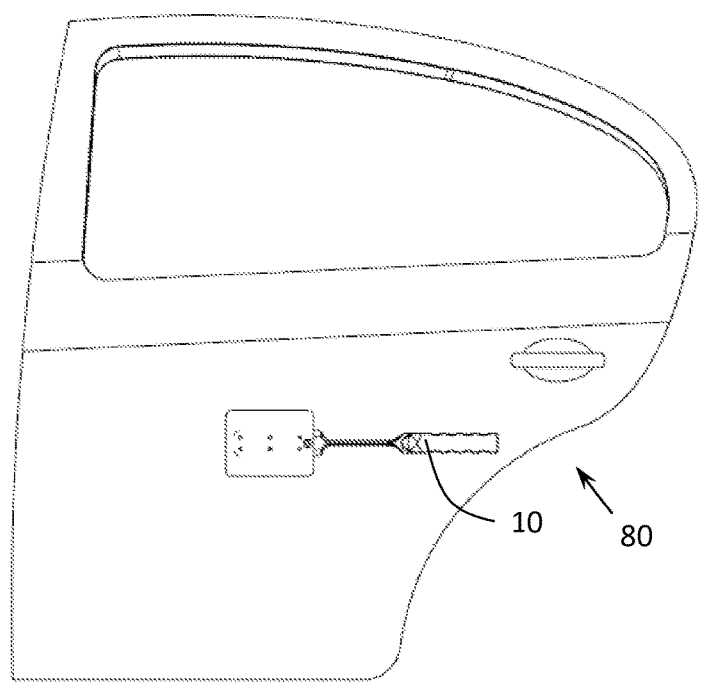
FIG. 9 is an illustration of a wand attached to a vehicle body panel.

FIG. 9 shows wand 10 on the surface of a vehicle panel 80, a car door.

Figure 10:
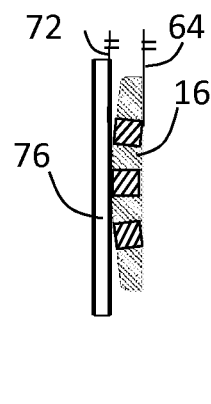
FIGS. 10-12 are illustrations of three positions that one embodiment of the wand can assume with respect to a body panel.

FIG. 10 is a detail of a cross section of test panel section 16 attracted to vehicle panel 76. In the position shown in FIG. 10, the center section is on vehicle panel 76 so that the upper surface of test panel section 16 on which the test panel (not shown) is applied is parallel to vehicle panel 76. Line 64 contiguous with the upper surface of test panel section 16 is parallel to line 72 which is contiguous with vehicle panel 76.

Figure 11:
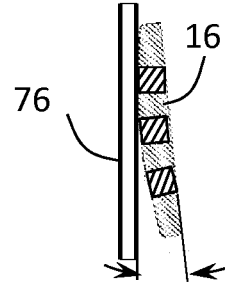
Figure 12:
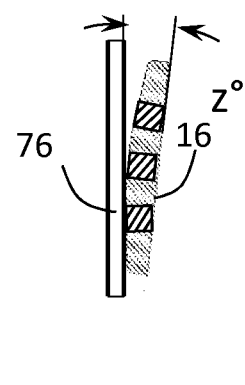

In FIG. 11, one of the side surfaces is attached to vehicle panel 76. The upper surface of test panel section 16 is offset from the surface of vehicle panel 76 by angle y. In FIG. 12, the lower surface of test panel 16 is offset from the surface of vehicle panel 76 by an angle z.

Figure 13:
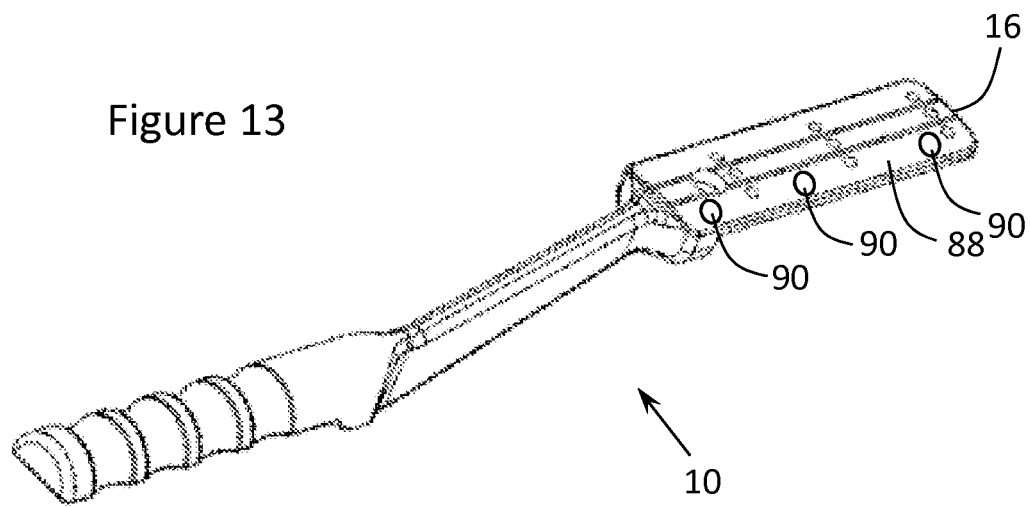
FIG. 13 is an illustration of the wand of FIG. 4 with glue dots applied onto one of the flat surfaces of the bottom of the wand.

Some vehicle panels are made of fiberglass, carbon fiber, plastic, or aluminum, materials which are not ferromagnetic. For such panels, glue dots can be applied to lower side of the wand to allow the wand to stick, temporarily, to a panel for paint matching. In FIG. 13, wand 10 has glue dots 90 applied to one of the flat surfaces 88 on the lower side of test panel section 16. As many glue dots 90 as determined useful to allow wand 10 to adhere to the body panel may be applied. Glue dots 90 may be applied to each of the flat surfaces on the lower side of test panel section 16. Glue dots 90 are easily removable and disposed of. The magnets are used to hold a metallic test panel. However, if a test panel of a non-ferromagnetic material were to be used, glue dots 90 may also be applied to the upper surface of test panel section 16 to hold the test panel.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A wand, comprising:
   a handle section; and
   a unitary test panel section coupled to the handle section wherein:
   the test panel section has a flat upper side;
   the test panel section has a lower side having at least a first flat surface and a second flat surface;
   at least one of the first flat surface and the second flat surface is not parallel with the upper flat side; and
   the first flat surface and the second flat surface form a predetermined angle wherein the test panel has a first plurality of holes defined in the first flat surface of the test panel section and a second plurality of holes defined in the second flat surface of the test panel section, the wand further including:
   a first plurality of magnets inserted into the first plurality of holes; and
   a second plurality of magnets inserted into the second plurality of holes.

2. The wand of claim 1 wherein the handle section is coupled to the test panel section via a transition section.

3. The wand of claim 1 wherein an outer surface of the first plurality of magnets is flush with or below the first flat surface; and an outer surface of the second plurality of magnets is flush with or below the second flat surface.

4. The wand of claim 1 wherein the first and second pluralities of magnets extend into the test panel section to the flat surface associated with the upper side to thereby attract metallic surfaces proximate the upper flat side and the lower side.

5. The wand of claim 1 wherein at least an outer surface of the wand is comprised of a paint-resistant material.

6. The wand of claim 1 wherein the wand is comprised of polypropylene.

7. The wand of claim 1 wherein the lower side further includes a third flat surface that is not parallel to the upper flat side.

8. The wand of claim 1 wherein the handle section has multiple depressions to thereby form a hand grip.

9. The wand of claim 1 wherein a plurality of glue dots is applied to at least one of the first flat surface, the second flat surface, and the upper flat side.

10. A wand, comprising:
    a handle section;
    a transition section coupled to the handle section;
    a test panel section coupled to the transition section, the test panel section having an upper side that is flat and a lower side that comprises at least a first flat surface and a second flat surface with the first flat surface forming a line of intersection with the second flat surface; and a plurality of magnets embedded in the first and second flat surfaces of the test panel section.

11. The wand of claim 10 wherein the transition section and the test panel section intersect to form a predetermined angle; the handle section and the transition section intersect to form the predetermined angle; and an axis taken along the length of the handle section and a line taken along the length of the test panel section are substantially parallel.

12. The wand of claim 10 wherein:
the test panel section further comprises a third flat surface;
the line of intersection of the first flat surface with the second flat surface is roughly parallel to a line running along the length of the test panel section; and
the second flat surface forms a second line of intersection with the third flat surface that is roughly parallel to the line running along the length of the test panel section.

13. The wand of claim 12 wherein a first portion of the plurality of magnets is embedded in the first flat surface, a second portion of the plurality of magnets is embedded in the second flat surface, and a third portion of the plurality of magnets is embedded in the third flat surface.

14. The wand of claim 10 wherein an outer surface of the wand is paint resistant.

15. The wand of claim 10 wherein the handle section, the transition section and the test panel section are integrally formed.

16. A wand, comprising:
a handle section;
a transition section coupled to the handle section;
a unitary test panel section coupled to the transition section, the test panel section having an upper flat side and a lower side that has first and second flat surfaces and a plane of the first flat surface does not lie in a plane of the second flat surface wherein the handle section, transition section, and test panel section are integrally formed of polypropylene with magnets inserted into openings provided in the test panel section.

17. The wand of claim 16 wherein the lower side further comprises a third flat surface; the first and second flat surfaces intersect in a first predetermined angle; the second and third flat surfaces intersect in a second predetermined angle; and a line of intersection between the first and second flat surfaces is substantially parallel to a line of intersection between the second and third flat surfaces.

* * * * *